H. C. EGERTON.
AUTOMOBILE TIRE.
APPLICATION FILED OCT. 8, 1918.
1,382,718.
Patented June 28, 1921.
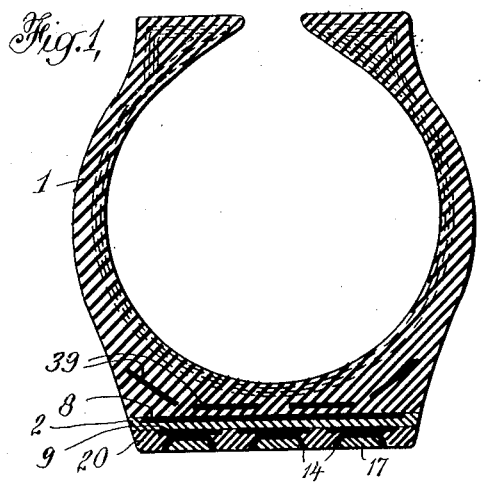
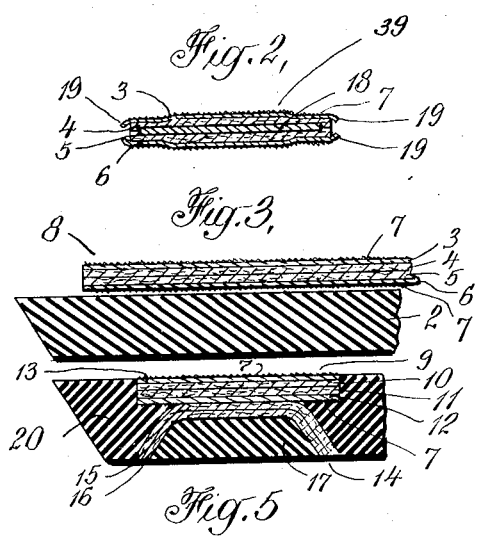
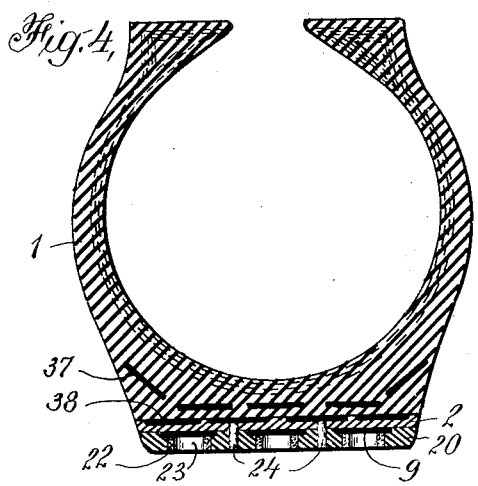
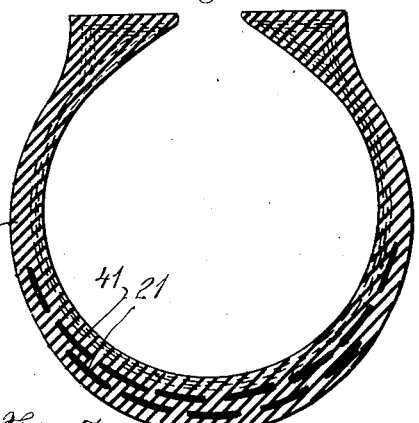
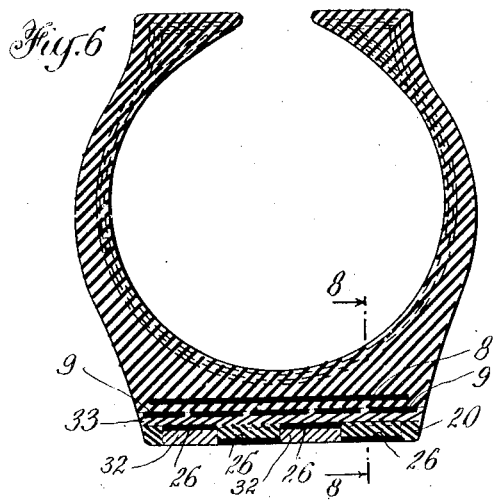
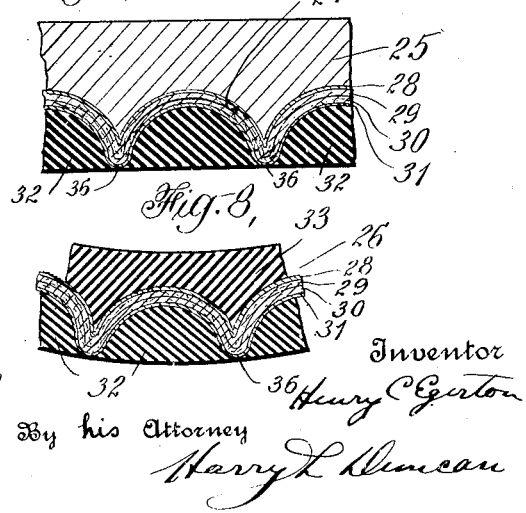

UNITED STATES PATENT OFFICE.

HENRY C. EGERTON, OF RIDGEWOOD, NEW JERSEY.

AUTOMOBILE-TIRE.

1,382,718.  Specification of Letters Patent.  Patented June 28, 1921.

Application filed October 8, 1918. Serial No. 257,330.

*To all whom it may concern:*

Be it known that I, HENRY C. EGERTON, a citizen of the United States, and resident of Ridgewood, county of Bergen, and State of New Jersey, have made a certain new and useful Invention Relating to Automobile-Tires, of which the following is a specification, taken in connection with the accompanying drawing.

This invention relates especially to pneumatic or other automobile or vehicle tires in which puncture resisting and strengthening material comprising fabric or other fibrous material carrying or impregnated with cured phenolic condensation cementing material are incorporated and securely vulcanized or cemented to the vulcanized rubber and other elements of the tire. Where considerable flexibility or liveliness is desirable in the tire it is preferable to have such puncture resisting material in the form of a number of layers of separated disks or other elements interposed between layers of elastic vulcanized rubber and the disks or elements in adjacent layers may of course be advantageously staggered in position so as to secure the maximum of overlapping protecting action. Each of these disks or elements which may in some cases be in the form of circumferentially or transversely extending strips or pieces may comprise a number of layers of canvas or other fabric such as cloth, paper or other fibrous or porous material with which a considerable proportion of phenolic condensation cementing material, such as bakelite, condensite or redmanol varnish compositions, has been incorporated. Metallic reinforcements in plate or other form may advantageously be incorporated in the tire tread by embedding them in such fabric or fibrous material which can be strongly and securely cemented around the metallic elements and also vulcanized or securely held in place in the embedding rubber so as to prevent creep or wear of the metal pieces and consequent injury to the rubber of the tire. In most cases it is of course desirable to have the tire tread of substantially flat or cylindrical form where the tire is to be used on fairly good roads since this tends to concentrate the natural flexing of the tire under load in the side walls thereof where puncture-proof material is correspondingly less necessary. If desired puncture resisting disks or elements adjacent the tread surface of the tire may act as supporting elements for hollow or cup-shaped gripping members which may be formed of any suitable fibrous material and incorporated cured phenolic condensation cementing and stiffening material so that when engaging relatively soft surfaces these hard stiff gripping elements tend to project somewhat and increase the traction of the tire on the roadway.

In the accompanying drawing showing in a somewhat diagrammatic way illustrative embodiments of the invention, Figure 1 is a transverse or axial section through an automobile tire casing of the straight side pneumatic type.

Fig. 2 is an enlarged transverse section through a metallic reinforced puncture resisting element.

Fig. 3 is a similarly enlarged view showing other parts of the tire tread.

Figs. 4 to 6 show in transverse section other forms of tires; and

Figs. 7 and 8 are enlarged details showing the manufacture and arrangement of the gripping members shown in Fig. 6, Fig. 8 being taken along the line 8—8 of Fig. 6.

The automobile or other vehicle tire of vulcanized rubber or generally similar construction may as indicated in Fig. 1 be of the straight side pneumatic type of casing with which the usual inner tube is adapted to coöperate when the tire is mounted on the wheel rim. This tire 1 may as indicated be advantageously formed with a substantially flat cylindrical tread surface so that this tread surface is adapted to engage a level roadway without lateral flexing, and lateral bending of the adjacent tread portions of the tire is thus considerably minimized while the lateral bending caused by the load on the wheel tends to take place to greater extent in the side walls of the tire which may be of any ordinary or desired construction and comprise the fabric reinforced vulcanized rubber elements indicated in a somewhat diagrammatic way in the drawing. One or more series of puncture resisting elements may be incorporated in the tread or other portions of the tire and may advantageously comprise cured phenolic condensation cementing material with which it is usually desirable to incorporate fabric or other fibrous material to minimize cracking and breaking. A convenient way of producing such puncture resisting elements which when present are adapted to prevent or minimize puncture of the tire by small nails, tacks, etc., is to thoroughly impregnate heavy canvas or other suitable fabric with bakelite varnish No. 1, for instance, by passing the cloth repeatedly through tanks in which pressure rolls are located. The treated fabric may then be dried at moderate heat of 150° to 175° F. and several layers assembled so that sheets a sixteenth to an eighth of an inch thick more or less are formed. For some purposes it is desirable to use connector elements on one or both sides of such puncture resisting material, and for this purpose relatively lighter canvas or other fabric may be applied thereto preferably after having its other side rubberized by the application of a frictioned or other rubber coating. Sheets or pieces of such compound fabric may be of the general character indicated at 8 in Fig. 3, for instance, in which 4, 5 are the layers of heavy impregnated canvas and 3, 6 the connector layers provided with frictioned or other rubberized coatings 7. Such a compound sheet may be preliminarily united by pressing together under moderate heat sufficient to soften the cementing material which penetrates the outer connector fabrics and cements the whole together. Disks or other shaped elements may be punched out or otherwise formed from such fabric and may, if desired, be more or less completely cured by being heated under pressure at temperatures of 200° to 250° F. more or less for a sufficient time to effect the partial or complete curing of such phenolic condensation cementing material preferably without curing or vulcanizing the rubber in the connector members. It is usually preferable, however, to at least complete the curing of such phenolic condensation cementing material at the same time that the rubber in the interposed layers or adjacent portions of the automobile tire is vulcanized and this heat curing and vulcanizing treatment may be effected in suitable molds where the parts are heated to temperatures of 250° to 320° F. more or less for an hour or so which simultaneously cures and vulcanizes the cementing material and cements all the elements together.

For some purposes it is desirable to incorporate a metallic reinforcement in plate or other form within such fibrous puncture resisting elements and as indicated in Fig. 2 the tempered steel or other reinforcing plate 18 may be interposed between the layers 4, 5 of canvas or other fabric carrying such phenolic condensation cementing material, the edges of these impregnated fabric layers preferably being forced into substantial contact so that they are securely cemented together and strongly held in engagement by the cementing material when finally cured so as to prevent any lateral shifting of the metallic reinforcing element and so as to also hold the parts together and give considerable strength to the tire in resisting splitting. The stiffeners of the cured impregnated fabric of the puncture resisting element 39 contribute considerably to this result and it is of course desirable to secure strong adherence between the fabric faces of the element and the adjacent vulcanized rubber portions and this may be secured either by directly forcing the parts together during the vulcanizing process which forces the rubber into the pores and interstices of the fabric sufficiently to give considerable strength of union, or if desired connector members, such as 3, 6, having previously rubberized coatings 7 may be used. As indicated in Fig. 2 these connector members may, if desired, have overlapping edge portions 19 which are adapted to lap around the edges of the puncture resisting element and still more strongly secure it to the enveloping rubber portions of the tire.

As indicated in Fig. 3 the tread surface of the tire may in some cases be advantageously formed with a layer of such puncture resisting elements 9 comprising the fabric layers 13, 10, 11, 12, embedded in the vulcanizable rubber stock or composition 20 and having in contact therewith suitable hollow or cup-shaped gripping members 14 which may be formed of the desired number of layers of heavy canvas or knit cotton fabric 15, 16 similarly impregnated with such phenolic condensation cementing material and stamped up into cup shape and forced into contact with the outer layer of puncture resisting and supporting disks or elements 9. If desired the inside of these cup shaped gripping members, which otherwise preferably have substantially smooth inner surfaces to facilitate disengagement of dirt therefrom may be filled with rubber composition portions or pieces 17 to make the tire tread surface substantially flush. A compound sheet or strip of tread stock having these puncture resisting supporting and gripping elements incorporated therewith may be wound around the tread of the tire and the whole cured and vulcanized under pressure in a suitable mold in connection with the other tire elements which may as indicated in Fig. 3 comprise a layer of rubber tread stock 2 and a circumferential sheet or strip 8 of such impregnated fabric puncture resisting material. Instead of or in addition to such a substantially continuous sheet or strip one or more layers of separated disks or elements 39 of similar puncture resisting fabric and incorporated metallic plate reinforcements, if desired, may be built into the tire before it is finally molded and cured and vulcanized. The thickness of the metallic plate reinforcements used in these elements and the thickness of the impregnated fabric, whether or not such metallic reinforcement is used, naturally depends on the kind of tire and the service to which it is to be subjected. Very considerable puncture protection may be secured by several layers of cured and impregnated canvas a sixteenth to an eighth of an inch or so thick and for this purpose it is usually desirable to have a high proportion of such phenolic condensation cementing material present, since the resistance to puncture and the amount of bending or deflecting action on an entering light nail or point is thereby increased. For this reason forty to sixty-five per cent. or more of such cured phenolic condensation cementing material may advantageously be present in the cured fabric and it is usually desirable where such higher proportions of this cementing material are used to at least partially cure the puncture resisting elements before they are incorporated in the tire so as to minimize the softening and melting of the cementing material and correspondingly prevent its being squeezed out between the rubber layers or surfaces to an undesirable extent.

Fig. 4 shows another arrangement in which three layers of separated puncture resisting disks or elements are incorporated in the tread portion of the tire which in this case also has a substantially flat tread surface. These three layers of disks 9, 38 and 37 are arranged with layers of vulcanized rubber between them which in order to secure a relatively great degree of flexibility in the tire should be of relatively elastic and pure rubber stock. As indicated in Fig. 4 the disks or elements in the adjacent layers are preferably staggered and gripping tread members may be incorporated in the tread surface of the tire and may comprise hollow members 22, such as may be conveniently formed by impregnating heavy woven cotton hose fabric with such phenolic condensation cementing material and drying the same and forcing one edge of the hollow member or ring into engagement with a compound impregnated fabric element, such as 9, and preliminarily cementing it thereto so that an open space 23 is left in the outer tread surface. As indicated a compound strip of such tread stock 20 may be made up preferably so as to comprise the rubber layer 2 and then applied to the outer surface of the tire, the holes 23 being filled during the vulcanizing and curing heat treatment by metallic cylindrical members or studs which may be separate or incorporated in the sections of the tire mold. Additional solid gripping members, such as 24 may be used in the tire tread in addition to or instead of the hollow gripping members 22. These members 24 may consist of sections of twisted woven or braided cord or rope thoroughly impregnated with such phenolic condensation cementing material and arranged in apertures in the tread stock so that during the molding of the tire they are forced into engagement with a layer of such puncture resisting or supporting elements 38 and 70 permanently cemented and secured thereto, which of course promotes their gripping action under service conditions. Fig. 5 shows another form of tire 40 in which the tread surface is of rounded form in cross-section. The tread portion of this tire may as indicated comprise two or more layers of such puncture resisting stiffening disks or elements 40, 21 which are staggered in the different layers to minimize the possibility of penetration therethrough as in the Fig. 4 construction. All of these elements are securely molded within the vulcanized rubber tread portion of the tire so as to form a unitary structure which is subject to the minimum extent to blistering or splitting when such phenolic condensation cementing material is used to strengthen and stiffen these puncture resisting fibrous elements which can thus be more intimately and strongly incorporated in the vulcanized rubber.

Fig. 6 shows another form of tire which may advantageously though not necessarily have a substantially flat or cylindrical tread surface. In this instance a substantially continuous or circumferential strip or sheet 8 of such compound fabric preferably carrying large proportions of cured phenolic condensation cementing material may be used as an inner puncture resisting element while one or more layers 9 of separated puncture resisting elements of this general character may be used outside thereof. For some purposes it is desirable to use sinuous strips or sheets of such cured impregnated fabric adjacent the tread surface of the tire so that they can be formed with projecting portions extending, if desired, into gripping engagement with the roadway and have increased traction effects as well as acting as puncture resisting elements in protecting the air space of the tire. Where as indicated in Fig. 6 a number of such sinuous strips are used it is preferable to have the projecting portions in adjacent strips arranged in staggered relation which correspondingly minimizes side slip and gives a more even and desirable traction effect.

As indicated in Figs. 7 and 8 such puncture resisting gripping strips or elements may be conveniently formed from strips of compound fabric comprising heavy canvas or other fabric layers 29, 30 heavily impregnated with such phenolic condensation cementing material and used, if desired, in connection with coöperating connector layers 28, 31 which may be of lighter fabric of open mesh surface to which a frictioned or other rubberized coating has been applied. Such a compound strip may as indicated in Fig. 7 be arranged within a metallic mold 25 into which it may be progressively forced so as to secure the sinuous form of the strip indicated. Then vulcanizable rubber composition 32 may be strongly forced into the resulting spaces between the projecting portions 36 of the fabric and of course several strips may be simultaneously forced into adjacent portions of a compound mold so as to simultaneously form the entire number of strips desired for a single tire tread. When the strips have been formed and the coöperating rubber portions forced into engagement therewith they may be removed from the mold and a previously shaped or molded rubber strip 33 may be forced against the other side of the fabric so as to form a straight or curved compound strip of tread material of the character indicated in Fig. 8. Of course any desired sinuous zigzag arrangement of the compound stiffened fabric may be used instead of the particular sinuous arrangement indicated. In some cases also it may be desirable to flute or corrugate a considerable width of such impregnated compound fabric at once, as by forcing it into a mold having wide corrugations or irregularities or by running it through suitably shaped crimping rolls. The rubber elements may be incorporated therewith in any suitable way as by forcing the rubber into the depressions on one or both sides of the fabric in suitable molds or corrugated rolls and then the compound rubber and incorporated stiffener fabric may be slit into suitable widths and assembled on the tire tread as desired. Of course such strips may be cut and arranged so that the zigzag or sinuous stiffener fabric is arranged edgewise to the circumferential tread surface so as to form zigzag or sinuous stiffening ridges or lines thereon giving increased gripping and traction effects although having less puncture resisting action. In some cases a series of braided, woven or twisted cords or small ropes impregnated with such phenolic condensation cementing material may be used instead of such a compound fabric as described and may be similarly embedded in the rubber composition to form a special tread strip which may be molded upon and cemented to the other tire elements. Such cords or ropes may have a sinuous or zigzag arrangement so that projecting portions extend at intervals out toward the tread surface of the tire to form gripping projections, or they may be located nearer to the tread surface of the tire throughout their extent so as to form harder zigzag gripping portions adjacent to or projecting on the tread surface to more effectively engage soft ground. This may of course be applied to the outside or tread portion of the partly molded tire shown in Fig. 6 and the whole cured and vulcanized in a metallic or other tire mold in which the desired pressure can be maintained during the heat treatment required for the curing and vulcanizing of the material and the cementing of all the parts together.

In some cases of course metallic reinforcing portions may be incorporated within and cemented to the compound fabric strips, either adjacent the projecting gripping portions 36 indicated in Fig. 8 or in the recessed depressed portions of the strip, and suitably curved or shaped strips or pieces of tempered steel or other material may be used if desired. Such metallic plate or other reinforcements are preferably coated with suitable phenolic condensation enamel compositions such as bakelite metal enamels for instance, which when baked on in the usual way produce strongly adherent tough coatings promoting the adherence of the metals to the adjacent fabric impregnated with the phenolic condensation cementing material. In some cases also the metallic plate reinforcements used in the separated disk or other puncture resisting elements may with advantage be similarly coated with such adherent bakelite or other enamel compositions before being united to the adjacent impregnated paper or other fabric elements described in connection with Fig. 2, for instance.

This invention has been described in connection with a number of illustrative embodiments, forms, proportions, elements, parts, shapes, materials, compositions, and methods of preparation, production and use, to the details of which disclosure the invention is not of course to be limited, since what is claimed as new and what is desired to be secured by Letters Patent is set forth in the appended claims:

1. The pneumatic automobile tire comprising throughout the tread portion of the tire layers of vulcanized rubber and interposed incorporated layers of separated puncture resisting elements, each comprising layers of fabric carrying a large proportion of cured phenolic condensation cementing and stiffening material, some of said puncture resisting elements comprising metallic plate reinforcements inclosed within the fabric layers thereof and secured in position by said phenolic condensation cementing material, said elements being staggered in adjacent layers and comprising an outer layer of supporting elements and a series of hollow gripping members comprising fabric carrying cured phenolic condensation cementing material and cemented to said supporting elements and projecting adjacent the tread surface of the tire.

2. The pneumatic automobile tire comprising throughout the tread portion of the tire layers of vulcanized rubber and interposed incorporated layers of separated puncture resisting elements, each comprising layers of fabric carrying a large proportion of cured phenolic condensation cementing and stiffening material, said elements being staggered in adjacent layers and comprising an outer layer of supporting elements and a series of hollow gripping members comprising fabric carrying cured phenolic condensation cementing material and cemented to said supporting elements and projecting adjacent the tread surface of the tire.

3. The pneumatic vehicle tire formed with a substantially flat tread surface and comprising throughout the tread portion of the tire layers of vulcanized rubber and interposed incorporated layers of separated puncture resisting disk elements, each comprising layers of fabric carrying a large proportion of cured phenolic condensation cementing and stiffening material and rubberized fabric connectors coöperating with the interposed layers of rubber, some of said puncture resisting elements comprising metallic plate reinforcements inclosed within the fabric layers thereof and secured in position by said phenolic condensation cementing material.

4. The pneumatic vehicle tire formed with a substantially flat tread surface and comprising throughout the tread portion of the tire layers of vulcanized rubber and more than two interposed incorporated layers of separated puncture resisting disk elements, each comprising fabric carrying a large proportion of cured phenolic condensation cementing and stiffening material.

5. The pneumatic vehicle tire formed with a substantially flat tread surface and comprising throughout the tread portion of the tire layers of vulcanized rubber and more than two interposed incorporated layers of separated puncture resisting elements, each comprising fabric carrying a large proportion of cured phenolic condensation cementing and stiffening material.

6. The pneumatic vehicle tire comprising throughout the tread portion of the tire layers of a vulcanized rubber and a plurality of interposed incorporated layers of separated puncture resisting disk elements, each comprising fibrous material carrying a large proportion of cured phenolic condensation cementing and stiffening material and rubberized fabric connectors coöperating with the interposed layers of rubber.

7. The pneumatic vehicle tire comprising throughout the tread portion of the tire layers of vulcanized rubber and a plurality of interposed incorporated layers of separated puncture resisting elements, each comprising fibrous material carrying a large proportion of cured phenolic condensation cementing and stiffening material.

8. The pneumatic automobile tire comprising throughout the tread portion of the tire layers of vulcanized rubber and interposed incorporated layers of separated puncture resisting disk elements, each comprising layers of fibrous material carrying a large proportion of cured phenolic condensation cementing and stiffening material and rubberized fabric connectors coöperating with the interposed layers of rubber, some of said puncture resisting elements comprising metallic plate reinforcements inclosed within the fibrous layers thereof and secured in position by said phenolic condensation cementing material.

9. The pneumatic automobile tire comprising adjacent the tread portion of the tire layers of vulcanized rubber and interposed incorporated puncture resisting disk elements, each comprising layers of fibrous material carrying cured phenolic condensation cementing and stiffening material, some of said puncture resisting elements comprising metallic plate reinforcements.

10. The penumatic automobile tire comprising adjacent the tread portion of the tire layers of vulcanized rubber and interposed incorporated puncture resisting elements, each comprising fibrous material carrying cured phenolic condensation cementing and stiffening material.

11. The pneumatic vehicle tire comprising adjacent the tread portion of the tire vulcanized rubber and an incorporated layer of puncture resisting disk elements, each comprising layers of fibrous material carrying cured phenolic condensation cementing and stiffening material, some at least of said puncture resisting elements comprising metallic plate reinforcements inclosed within the fibrous layers thereof and secured in position by said phenolic condensation cementing material.

12. The vehicle tire comprising adjacent the tread portion of the tire, vulcanized rubber and incorporated puncture resisting elements, each comprising layers of fibrous material carrying cured phenolic condensation cementing and stiffening material, some at least of said puncture resisting elements comprising metallic plate reinforcements inclosed within the fibrous layers thereof.

13. The vehicle tire comprising adjacent the tread portion of the tire, incorporated puncture resisting elements, each comprising fibrous material carrying cured phenolic condensation cementing and stiffening material, some at least of said puncture resisting elements comprising metallic plate reinforcements.

14. The vulcanized rubber pneumatic vehicle tire formed with a substantially flat tread surface and comprising adjacent the tread portion of the tire securely incorporated puncture resisting disk elements, each comprising layers of fabric carrying a large proportion of cured phenolic condensation cementing and stiffening material and rubberized fabric connectors coöperating with the adjacent rubber surfaces.

15. The vulcanized rubber pneumatic vehicle tire comprising adjacent the tread portion of the tire securely incorporated puncture resisting disk elements, each comprising layers of fabric carrying a large proportion of cured phenolic condensation cementing and stiffening material.

16. The vulcanized rubber pneumatic vehicle tire comprising adjacent the tread portion of the tire securely incorporated elements, each comprising fabric carrying cured phenolic condensation cementing and stiffening material.

17. The vulcanized rubber pneumatic vehicle tire comprising incorporated resisting elements, each comprising fibrous material carrying cured phenolic condensation cementing and stiffening material.

18. The tire comprising incorporated puncture resisting elements carrying cured phenolic condensation cementing and stiffening material.

19. The pneumatic vehicle tire formed with a substantially flat tread surface and comprising in the tread portion of the tire incorporated puncture resisting elements, each comprising fibrous material carrying a large proportion of cured phenolic condensation cementing and stiffening material and rubberized fabric connectors coöperating with the adjacent vulcanized rubber, some of said elements being substantially continuous circumferential strips of such puncture resisting material and an outer layer of said elements having projecting gripping portions adapted to engage the roadway.

20. The pneumatic vehicle tire comprising in the tread portion of the tire vulcanized rubber and incorporated puncture resisting elements, each comprising fibrous material carrying a large proportion of cured phenolic condensation cementing and stiffening material, some of said elements being strips of such puncture resisting material and an outer layer of said elements having projecting gripping portions adapted to engage the roadway.

21. The pneumatic vehicle tire comprising in the tread portion of the tire vulcanized rubber and incorporated puncture resisting elements, each comprising fibrous material carrying cured phenolic condensation cementing and stiffening material, some of said elements having projecting gripping portions adapted to engage the roadway.

22. The vulcanized rubber vehicle tire formed with a substantially flat tread surface and comprising adjacent the tread portion of the tire vulcanized rubber and incorporated puncture resisting disk elements comprising fibrous material carrying cured phenolic condensation cementing and stiffening material, some of said puncture resisting elements having projecting gripping portions connected to said incorporated disk elements and adapted to coöperate with the roadway.

23. The vulcanized rubber vehicle tire comprising adjacent the tread portion of the tire vulcanized rubber and incorporated puncture resisting disk elements comprising fibrous material carrying cured phenolic condensation cementing and stiffening material, some of said puncture resisting elements having projecting gripping portions connected to said incorporated disk elements and adapted to coöperate with the roadway.

24. The vulcanized rubber vehicle tire comprising adjacent the tread portion of the tire vulcanized rubber and incorporated puncture resisting elements comprising fibrous material carrying cured phenolic condensation cementing and stiffening material, some of said puncture resisting elements having gripping portions connected to said incorporated elements and adapted to coöperate with the roadway.

25. The pneumatic vehicle tire comprising adjacent the tread portion of the tire vulcanized rubber and incorporated puncture resisting disk elements, each comprising fabric carrying cured phenolic condensation cementing and stiffening material and cup shaped hollow gripping members comprising fibrous material and cured phenolic condensation cementing material secured to some of said puncture resisting disk elements and having projecting gripping portions adapted to coöperate with the roadway.

26. The vehicle tire comprising adjacent the tread portion of the tire vulcanized rubber and incorporated and cup shaped hollow gripping members comprising fibrous material and cured phenolic condensation cementing material, and having projecting gripping portions adapted to coöperate with the roadway.

27. The vehicle tire comprising adjacent the tread portion of the tire vulcanized rubber and incorporated hollow gripping members comprising fibrous material and cured phenolic condensation cementing material and having projecting gripping portions adapted to coöperate with the roadway.

28. The vehicle tire comprising adjacent the tread portion of the tire vulcanized rubber and incorporated gripping members comprising fibrous material and cured phenolic condensation cementing material and having projecting gripping portions adapted to coöperate with the roadway.

29. The pneumatic automobile tire formed with a substantially flat tread surface and comprising adjacent the tread portion of the tire vulcanized rubber and securely incorporated hollow gripping traction elements comprising layers of fabric carrying cured phenolic condensation cementing and stiffening material and having projecting gripping portions adapted to coöperate with the roadway and disk supporting elements embedded in the tire tread and connected to said traction elements.

30. The tire comprising adjacent the tread portion of the tire vulcanized rubber and securely incorporated gripping traction elements comprising layers of fabric carrying cured phenolic condensation cementing and stiffening material and having projecting gripping portions adapted to coöperate with the roadway.

31. The tire comprising adjacent the tread portion of the tire vulcanized rubber and securely incorporated traction elements comprising layers of fibrous material carrying cured phenolic condensation cementing and stiffening material and having projecting gripping portions adapted to coöperate with the roadway.

32. The vulcanized rubber vehicle tire comprising adjacent the tread portion of the tire vulcanized rubber and cup shaped gripping members comprising fibrous material carrying cured phenolic condensation cementing material and securely incorporated in said rubber and projecting adjacent the tread surface of the tire.

33. The vulcanized rubber vehicle tire comprising adjacent the tread portion of the tire vulcanized rubber and gripping members comprising fibrous material carrying cured phenolic condensation cementing material and securely incorporated in said rubber and projecting adjacent the tread surface of the tire.

HENRY C. EGERTON.